United States Patent
Park

(10) Patent No.: US 8,145,213 B2
(45) Date of Patent: Mar. 27, 2012

(54) APPARATUS AND METHOD FOR GENERATING PLMN LIST IN MOBILE COMMUNICATION SYSTEM

(75) Inventor: Won-Jong Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 1287 days.

(21) Appl. No.: 11/778,933

(22) Filed: Jul. 17, 2007

(65) Prior Publication Data

US 2008/0020761 A1    Jan. 24, 2008

(30) Foreign Application Priority Data

Jul. 19, 2006  (KR) ................ 10-2006-0067193

(51) Int. Cl.
*H04W 4/00* (2009.01)
*H04B 1/38* (2006.01)
*G06F 9/45* (2006.01)

(52) U.S. Cl. .............. 455/434; 455/435.2; 455/558; 717/168

(58) Field of Classification Search .......... 455/434, 455/435.2, 558; 717/168
See application file for complete search history.

(56) References Cited

U.S. PATENT DOCUMENTS

| 2002/0119774 A1* | 8/2002 | Johannesson et al. ........ 455/434 |
| 2003/0129971 A1* | 7/2003 | Gopikanth ................... 455/414 |
| 2004/0203744 A1* | 10/2004 | Hicks et al. ................. 455/432.1 |
| 2004/0253947 A1* | 12/2004 | Phillips et al. ............. 455/422.1 |
| 2005/0113088 A1* | 5/2005 | Zinn et al. .................. 455/435.2 |
| 2006/0264215 A1* | 11/2006 | Ekstedt et al. ............. 455/435.2 |
| 2007/0254646 A1* | 11/2007 | Sokondar .................. 455/432.1 |

FOREIGN PATENT DOCUMENTS

KR   1020040062828   7/2004

* cited by examiner

*Primary Examiner* — Dwayne Bost
*Assistant Examiner* — Timothy Pham
(74) *Attorney, Agent, or Firm* — The Farrell Law Firm, P.C.

(57) ABSTRACT

Provided are an apparatus and method for generating a Public Land Mobile Network (PLMN) list in a mobile communication terminal. The method includes: generating an available PLMN list by searching PLMNs through a Radio Frequency (RF) channel, and determining if Location Area Code (LAC) information is contained in the available PLMN list; generating a PLMN list from PLMN information matched with Mobile Country Code (MCC) information and Mobile Network Code (MNC) information and existing in a Subscriber Identity Module (SIM) card, when no LAC is contained in the available PLMN list; and deleting items duplicated in the generated PLMN list.

8 Claims, 3 Drawing Sheets

APPARATUS AND METHOD FOR GENERATING PLMN LIST IN MOBILE COMMUNICATION SYSTEM

PRIORITY

This application claims priority under 35 U.S.C. §119(a) to a Korean Patent Application filed in the Korean Intellectual Property Office on Jul. 19, 2006 and assigned Serial No. 2006-67193, the contents of which are incorporated herein by reference.

BACKGROUND OF THE INVENTION

1. Field of the Invention

The present invention relates generally to a mobile communication system, and in particular, to an apparatus and method for generating a Public Land Mobile Network (PLMN) list in a mobile communication system. In the apparatus and method, neighboring PLMNs are searched when a user chooses a PLMN manual selection mode using a mobile communication terminal having a Subscriber Identity Module (SIM) card supporting an Enhanced Operator Name String (EONS) associated with PLMN information. When no Local Area Code (LAC) is contained in the searched neighboring PLMNs, a PLMN list is generated using a Mobile Country Code (MCC) and a Mobile Network Code (MNC). Therefore, the PLMN list to be selected by the user is provided.

2. Description of the Related Art

A service area of a mobile communication system is determined by a Radio Access Network (RAN), including a Base Station (BS) and a Base Station Controller (BSC). In the service area, a region close to the RAN has a good signal sensitivity, but a region far from the RAN has a poor signal sensitivity. In addition, a lot of noise is mixed in a region outside the service area or a region where a lot of obstacles exist, resulting in the degradation of communication quality. In case a lot of service providers exist and a communication quality of a communication network currently connected is poor, a communication service can be received by accessing another neighboring communication network using a roaming service. To this end, the mobile communication terminal is designed to support a function of automatically or manually searching communication networks of other neighboring service providers and accessing the searched communication networks. The manual searching and accessing of the searched communication networks requires a procedure of searching networks and generating a network list and a procedure for accessing and registering a network selected from the network list by a user.

FIG. 1 is a schematic diagram of a conventional mobile communication system.

Referring to FIG. 1, a mobile communication terminal 100 accesses a first BS 110 via a wireless connection within a service area defined by the first BS 110 and registers in a first Mobile Switching Center (MSC) 120. In this way, the mobile communication terminal 100 receives a mobile communication service from the first MSC 120. Meanwhile, the communication service quality may be degraded when the mobile communication terminal 100 is located in a region outside the service area of the first BS 110.

When the region outside the service area of the first BS 110, where the mobile communication terminal 100 is located, belongs to a service area of an $N^{th}$ BS 112 and the signal quality of the $N^{th}$ BS 112 is poor, the mobile communication terminal 100 accesses the $N^{th}$ BS 112 and registers in an $N^{th}$ MSC 122. In this way, the mobile communication terminal 100 can continue to receive the mobile communication service using a roaming service.

In order to register in the $N^{th}$ MSC 122 through the $N^{th}$ BS 112 and receive the communication service of the $N^{th}$ network, the mobile communication terminal 100 searches and selects the $N^{th}$ network and requests a connection to the $N^{th}$ network. Then, the mobile communication terminal 100 registers in the $N^{th}$ MSC 122 in such a state that it is connected to the $N^{th}$ network.

When a user of a mobile communication terminal having a Subscriber Identification Module (SIM) card supporting an Extended Operator Name String (EONS) chooses a PLMN manual selection mode, if MCC, MNC and LAC information is contained within information of PLMNs searched through a Radio Frequency (RF) channel, a PLMN list can be generated by loading PLMN Network Names (PNNs) matched with the corresponding information on the SIM card. However, if the LAC information is not contained in the information of the searched PLMNs, it is difficult to generate the PLMN list.

Therefore, there is a need for an apparatus and method that can generate the PLMN list even when the LAC information is not contained in the information of the searched PLMNs.

SUMMARY OF THE INVENTION

An object of the present invention is to substantially solve at least the above problems and/or disadvantages and to provide at least the advantages below. Accordingly, an object of the present invention is to provide an apparatus and a method for generating a PLMN list in a mobile communication system.

Another object of the present invention is to provide an apparatus and method for generating a PLMN list even when LAC information is not contained in information of PLMNs searched through an RF channel.

According to an aspect of the present invention, a method for generating a PLMN list in a mobile communication terminal includes generating an available PLMN list by searching PLMNs through a Radio Frequency (RF) channel, and determining if Location Area Code (LAC) information is contained in the available PLMN list; generating a PLMN list from PLMN information matched with Mobile Country Code (MCC) information and Mobile Network Code (MNC) information and existing in a Subscriber Identity Module (SIM) card, when no LAC is contained in the available PLMN list; and deleting items duplicated in the generated PLMN list.

According to another aspect of the present invention, an apparatus for generating a PLMN list in a mobile communication terminal includes a controller for generating an available PLMN list by searching PLMNs through an RF channel, and providing PLMN information of a SIM card when no LAC information is contained in the available PLMN list; and a PLMN list generator for generating a PLMN list from the PLMN information matched with MCC information and MNC information of the available PLMN list and existing in the SIM card, and deleting items duplicated in the PLMN list.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

An apparatus and method for generating a PLMN list in a mobile communication terminal according to an embodiment of the present invention will be described below in detail with reference to FIGS. 2 and 3.

Figure 1:
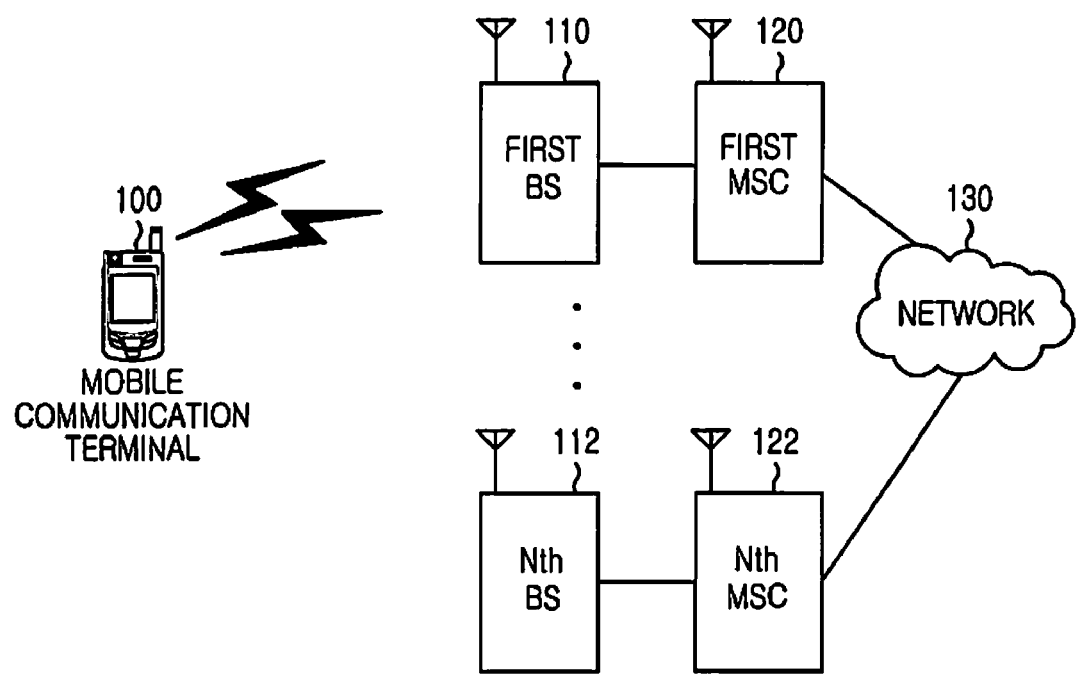
FIG. 1 is a schematic diagram of a conventional mobile communication system.
Figure 2:
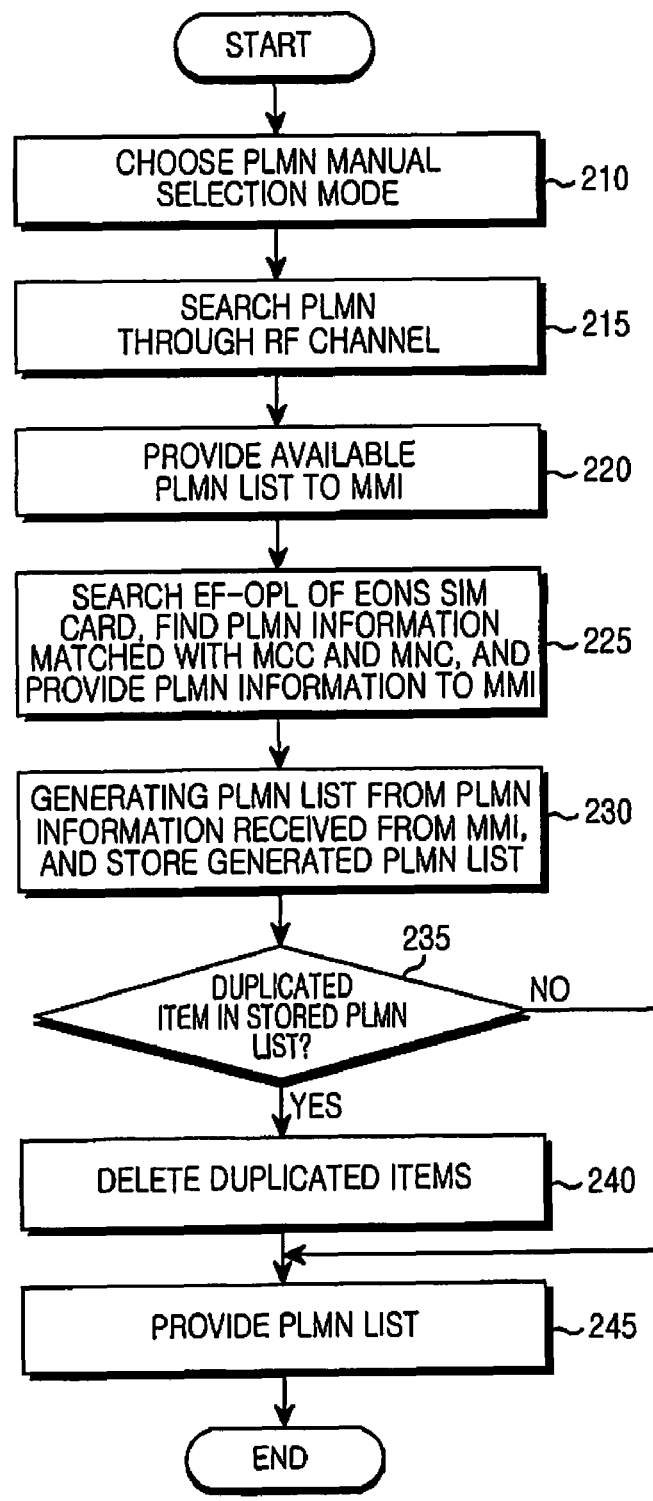
FIG. 2 is a flowchart of a procedure for generating a PLMN list according to an embodiment of the present invention.

FIG. 2 is a flowchart of a procedure for generating a PLMN list in a mobile communication terminal according to an embodiment of the present invention.

Referring to FIG. 2, the method for generating the PLMN list includes the steps of: generating a PLMN list by searching PLMNs matched with MCC information and MNC information from an Elementary File-Operator PLMN List (EF-OPL); and an EF-PLMN Network Name (EF-PNN) of an EONS SIM card using MCC and MNC information of the PLMNs searched through an RF channel; and removing PLMNs duplicated in the generated PLMN list.

Specifically, when a user enables a PLMN manual selection function in Step 210, a controller of the mobile communication terminal searches PLMNs through an RF channel in Step 215. Then, the controller provides a Man Machine Interface (MMI) of the mobile communication terminal with an available PLMN list of Table 1 containing the information of the searched PLMNs in Step 220. The MMI functions to connect the user to the mobile communication terminal. More specifically, the MMI generates the PLMN list of the present invention.

TABLE 1

| Available PLMN List | | |
|---|---|---|
| No. | MCC | MNC |
| 1 | a | A |
| 2 | a | B |
| 3 | b | C |
| 4 | b | D |

In Table 1, "MCC" and "MNC" represent mobile country code and mobile network information, respectively. The sum of the MCC and the MNC is 3 bytes. In addition, "a" or "b" represent the embodiments, respectively.

In Step 225, the MMI enables the controller to search, from the EF-OPL, PNN having the identical PLMN information (MCC, MNC) with respect to the PLMN information (MCC, MNC) contained in the available PLMN list of Table 1, and to acquire the PLMN information of the searched PNN from the EF-PNN. In other words, the MMI enables the controller to acquire the information of a specific PLNM from the EF-OPL and the name of the specific PLMN from the EF-PNN.

The EF-OPL and the EF-PNN represent files associated with the PLMN stored in the EONS SIM card. The structure of the EF-OPL and the structure of the EF-PNN are shown in Tables 2 and 3, respectively.

TABLE 2

| EF-OPL | | | | | |
|---|---|---|---|---|---|
| NO. | MCC | MNC | LAC-1 | LAC-2 | PNN Ptr |
| 1 | a | a | 0000 | FFFE | 1 |
| 2 | a | b | 1000 | 1500 | 1 |
| 3 | a | b | 3300 | 4150 | 3 |
| 4 | a | b | 5555 | 6000 | 1 |
| 5 | a | c | 2650 | 3100 | 2 |
| 6 | a | c | 4000 | 4120 | 1 |
| 7 | a | c | 6010 | 6050 | 1 |
| 8 | a | d | 1200 | 1800 | 1 |
| 9 | a | d | 5430 | 5600 | 3 |

In Table 2, "PNN Ptr" represents a pointer for the EF-PNN number. The PNN Ptr for the EF-OPL numbers 1, 2, 4, 6, 7 and 8 represent the PLMN A corresponding to the number 1 of Table 3. The PNN Ptr for the EF-OPL number 5 represents the PLMN B corresponding to the number 2 of Table 3. The PNN Ptr for the EF-OPL numbers 3 and 9 represents the PLMN C corresponding to the number 3 of Table 3.

TABLE 3

| EF-PNN | |
|---|---|
| NO. | PNN |
| 1 | PLMN A |
| 2 | PLMN B |
| 3 | PLMN C |

In Step 230, the MMI generates the PLMN list of Table 4 which is matched with the available PLMN list using the PLMN information acquired from the EF-OPL and the PNN information acquired from the EF-PNN, and stores the generated PLMN list.

TABLE 4

| PLMN LIST | | | |
|---|---|---|---|
| NO. | MCC | MNC | PNN |
| 1 | a | a | PLMN A |
| 2 | a | b | PLMN A |
| 3 | a | b | PLMN C |
| 4 | a | b | PLMN A |
| 5 | a | c | PLMN B |
| 6 | a | c | PLMN A |
| 7 | a | c | PLMN A |
| 8 | a | d | PLMN A |
| 9 | a | d | PLMN C |

When duplicated items are contained in the PLMN list of Table 4 in Step 235, the MMI deletes the duplicated items in Step 240 and provides the controller with the PLMN list without the duplicated items.

Table 5 is the PLMN list without the duplicated items in Table 4. That is, the items corresponding to the numbers 4 and 7 of Table 4 are deleted.

TABLE 5

| PLMN LIST | | | |
|---|---|---|---|
| NO. | MCC | MNC | PNN |
| 1 | a | a | PLMN A |
| 2 | a | b | PLMN A |
| 3 | a | b | PLMN C |

TABLE 5-continued

| PLMN LIST | | | |
|---|---|---|---|
| NO. | MCC | MNC | PNN |
| 4 | a | c | PLMN B |
| 5 | a | c | PLMN A |
| 6 | a | d | PLMN A |
| 7 | a | d | PLMN C |

When no duplicated items are contained in the PLMN list of Table 4 in Step 235, the MMI proceeds to Step 245 to provide the controller with the PLMN list stored in Step 230.

Then, the procedure of the present invention is terminated.

Figure 3:
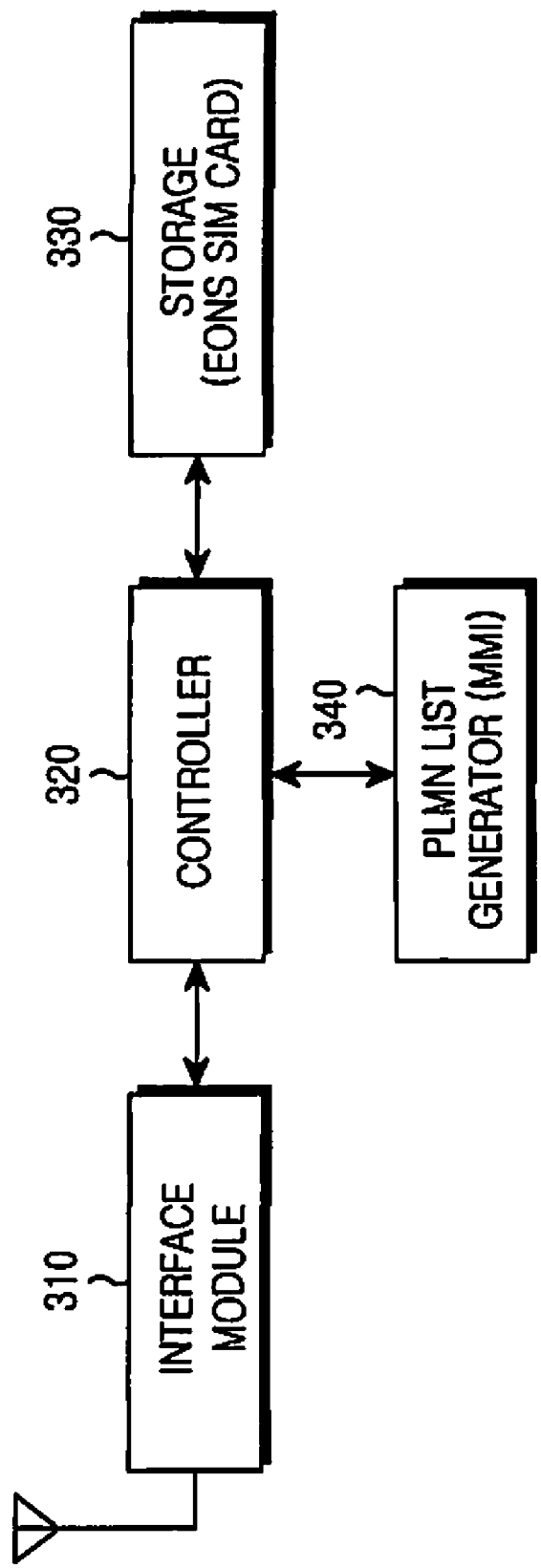
FIG. 3 is a block diagram of an apparatus for generating a PLMN list in a mobile communication terminal according to an embodiment of the present invention.

FIG. 3 is a block diagram of an apparatus for generating a PLMN list in a mobile communication terminal according to an embodiment of the present invention.

Referring to FIG. 3, the controller 320 controls generation of the PLMN list. For example, the controller 320 provides a PLMN list generator 340 with the PLMNs searched through an RF channel and the PLMN information stored in the EONS SIM card and generates the PLMN list to be manually selected by a user.

Under control of the controller 320, the PLMN list generator 340 generates the PLMN list from the searched PLMNs and the PLMN information of the EONS SIM card. Then, the PLMN list generator 340 deletes the duplicated PLMNs and generates the PLMN list to be manually selected by the user, and provides the generated PLMN list to the controller 320. The PLMN list generator 340 can perform the function of the MMI.

A storage 330 stores a control program and temporary data generated during the execution of the program. An EONS SIM card may be included in the storage 330.

An interface module 310 is a module for communicating with other nodes and includes an RF processor and a baseband processor. The RF processor converts a signal received through an antenna into a baseband signal to provide the converted signal to a baseband processor. In addition, the RF processor converts a baseband signal from the baseband processor into an RF signal, which can be transmitted over the air, and transmits the converted baseband signal to the antenna.

The controller 320 may perform the function of the PLMN list generator 340. In FIG. 3, components are separately illustrated so as to differentiate their functions. Therefore, in manufactured products, the controller 320 can be designed to perform all or a part of functions of the PLMN list generator 340.

As described above, when the user chooses a PLMN manual selection mode in the mobile communication terminal supporting the EONS SIM card, the PLMN list can be generated using the MCC information and the MNC information even though no LAC information is contained in the PLMNs searched through the RF channel.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for generating a Public Land Mobile Network (PLMN) list in a mobile communication terminal, comprising:
    generating, by a controller, an available PLMN list by searching PLMNs through a Radio Frequency (RF) channel;
    generating a PLMN list from PLMN information matched with Mobile Country Code (MCC) information and Mobile Network Code (MNC) information and existing in a Subscriber Identity Module (SIM) card, when no LAC information is contained in the available PLMN list; and
    deleting items duplicated in the generated PLMN list,
    wherein generating the PLMN list from the PLMN information existing in the SIM card comprises:
        acquiring information of the PLMNs matched in an Elementary File-Operator PLMN List (EF-OPL); and
        acquiring names of the matched PLMNs from an EF-PLMN Network Name (PNN); and
        generating the PLMN list.

2. An apparatus for generating a PLMN list in a mobile communication terminal, comprising:
    a controller for generating an available PLMN list by searching PLMNs through an RF channel, and providing PLMN information of a SIM card when no LAC information is contained in the available PLMN list; and
    a PLMN list generator for generating a PLMN list from the PLMN information matched with MCC information and MNC information of the available PLMN list and existing the SIM card, and deleting items duplicated in the PLMN list,
    wherein the PLMN list generator acquires information of the PLMNs matched with the MCC information and the MNC information of the available PLMN list, acquires names of the matched PLMNs from an EF-PNN, and generates the PLMN list.

3. A non-transitory computer-readable recording medium having recorded thereon a program for generating a Public Land Mobile Network (PLMN) list in a mobile communication terminal, comprising;
    a first code segment for generating an available PLMN list by searching PLMNs through a Radio Frequency (RF) channel;
    a second code segment for acquiring information of the PLMNs matched in an Elementary File-Operator PLMN List (EF-OPL) when no LAC information is contained in the available PLMN list;
    a third code segment for acquiring names of the matched PLMNs from an EF-PLMN Network Name (PNN);
    a fourth code segment for generating the PLMN list; and
    a fifth code segment for deleting items duplicated in the generated PLMN list.

4. A method for generating a PLMN list in a mobile communication terminal, comprising:

generating, by a controller, an available PLMN list by searching PLMNs through a Radio Frequency (RF) channel;

searching PNN (PLMN Network Name) pointers matched with Mobile Country Code (MCC) information and Mobile Network Code (MNC) information in an Elementary File-Operator PLMN List (EF-OPL), when no LAC information is contained in the available PLMN list;

searching PNNs matched with the PNN pointers in a EF-PNN;

generating a PLMN list using the PNNs matched MCC information, the PNNs matched MNC information and the PNNs; and deleting items duplicated in the generated PLMN list.

5. A non-transitory computer-readable recording medium having recorded thereon a program for generating a Public Land Mobile Network (PLMN) list in a mobile communication terminal, comprising:

a first code segment for generating an available PLMN list by searching PLMNs through a Radio Frequency (RF) channel;

a second code segment for searching PNN (PLMN Network Name) pointers matched with Mobile Country Code (MCC) information and Mobile Network Code (MNC) information in an Elementary File-Operator PLMN List (EF-OPL), when no LAC information is contained in the available PLMN list;

a third code segment for generating a PLMN list using the PNNs matched MCC information, the PNNs matched MNC information and the PNNs; and a fourth code segment for deleting items duplicated in the generated PLMN list.

6. An apparatus for generating a PLMN list in a mobile communication terminal, comprising:

means for generating an available PLMN list by searching PLMNs through a Radio Frequency (RF) channel;

means for searching PNN (PLMN Network Name) pointers matched with Mobile Country Code (MCC) information and Mobile Network Code (MNC) information in an Elementary File-Operator PLMN List (EF-OPL), when no LAC information is contained in the available PLMN list;

means for searching PNNs matched with the PNN pointers in a EF-PNN;

means for generating a PLMN list using the PNNs matched MCC information, the PNNs matched MNC information and the PNNs; and means for deleting items duplicated in the generated PLMN list.

7. A system for generating a PLMN list in a mobile communication terminal, comprising:

a base station for broadcasting PLMN information; and a mobile station for generating an available PLMN list by searching PLMNs from the PLMN information through an RF channel, and providing PLMN information of a SIM card when no LAC information is contained in the available PLMN list, and searching PNN (PLMN Network Name) pointers matched with Mobile Country Code (MCC) information and Mobile Network Code (MNC) information in an Elementary File-Operator PLMN List (EF-OPL) when no LAC information is contained in the available PLMN list, and searching PNNs matched with the PNN pointers in a EF-PNN, and generating a PLMN list using the PNNs matched MCC information, the PNNs matched MNC information and the PNNs, wherein the mobile station deletes items duplicated in the generated PLMN list.

8. A system for generating a PLMN list in a mobile communication terminal, comprising:

a base station for broadcasting PLMN information; and a mobile station for generating an available PLMN list by searching PLMNs from the PLMN information through an RF channel, and using PLMN information of a SIM card when no LAC information is contained in the available PLMN list, and acquiring information of the PLMNs matched with the MCC information and the MNC information of the available PLMN list, and acquiring names of the matched PLMNs from an EF-PNN, and generating a PLMN list from the PLMN information matched with MCC information and MNC information of the available PLMN list and existing the SIM card, wherein the mobile station deletes items duplicated in the generated PLMN list.

* * * * *